Figure 1:
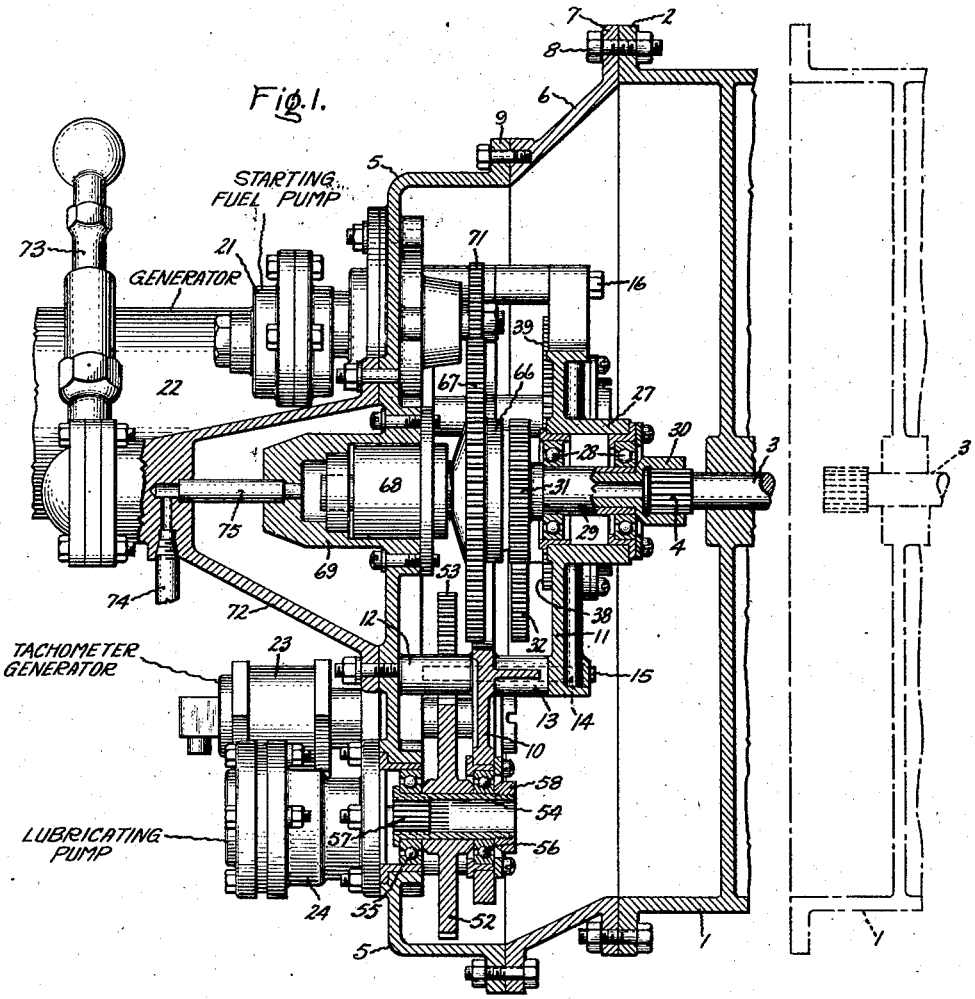

Dec. 9, 1947.　　　D. F. WARNER　　　2,432,358
POWER PLANT
Filed March 7, 1944　　　2 Sheets-Sheet 1

Inventor:
Donald F. Warner,
by Harry E. Dunham
His Attorney.

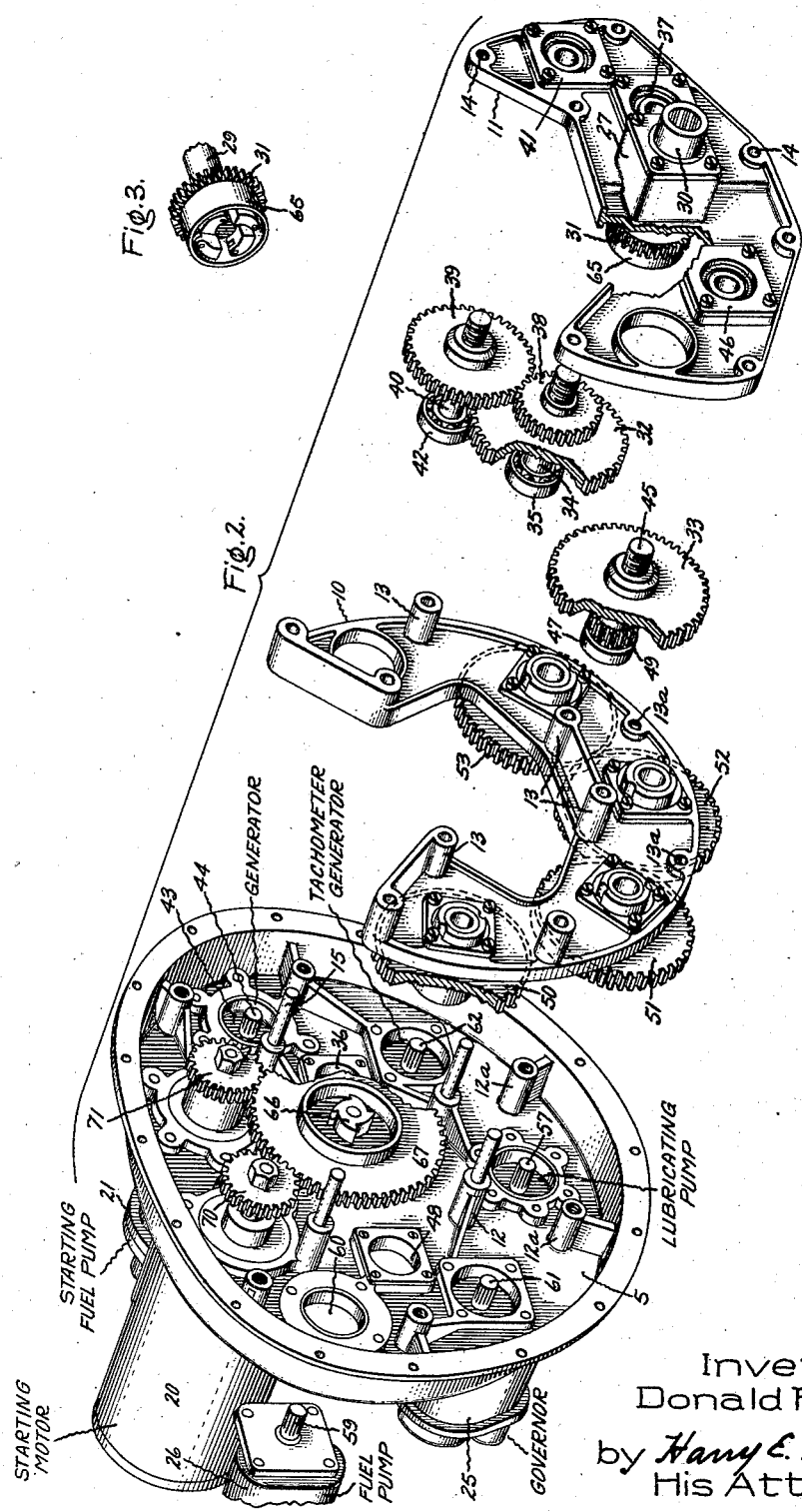

Patented Dec. 9, 1947

2,432,358

UNITED STATES PATENT OFFICE 2,432,358

POWER PLANT

Donald F. Warner, Swampscott, Mass., assignor to General Electric Company, a corporation of New York Application March 7, 1944, Serial No. 525,389

4 Claims. (Cl. 74—389)

The present invention relates to power plants and especially to gas turbine power plants comprising an air compressor supplying air under pressure to a combustion chamber or chambers in which fuel is burned and from which the hot products of combustion are supplied to a turbine wheel, the wheel in turn driving the air compressor, the excess of power in the hot products of combustion over that required to drive the air compressor being used to generate power. Such power plants require a number of auxiliaries such as motors, pumps, generators and the like for use in starting and while running, and the primary object of my invention is to provide in a power plant an improved construction and arrangement of auxiliaries whereby such auxiliaries form a unitary sub-assembly or section of the power plant which can be assembled as a unit and tested quite apart from the power plant as a whole and which can be attached to and removed from the power plant as a unit.

For a consideration of what I believe to be novel and my invention, attention is directed to the following specification and to the claims appended thereto.

In the drawing, Fig. 1 is a sectional view of an auxiliaries section of a power plant embodying my invention, the same being shown bolted to the main casing of the power plant; Fig. 2 is a perspective exploded view of the auxiliaries section, and Fig. 3 is a detail perspective view of a part of an over-running clutch.

Referring to the drawing, I indicates a portion of the casing of a gas turbine power plant having a bolting flange 2. For example, it may be specifically a part of the compressor casing, it being understood that the compressor casing, the turbine casing and the combustion chambers may be assembled together to form the complete power plant. Such a power plant, and one which may embody my invention is disclosed in the application of Dale D. Streid, Serial No. 525,391, filed of even date herewith and assigned to the same assignee as the present invention. Only the front end of casing I is shown in the drawing, this being all that is needed for an understanding of my invention. At 3 is shown a driving shaft for the auxiliaries having at its end an external spline 4. Shaft 3 is driven from the turbine shaft of the power plant.

The auxiliaries section comprises a casing having an end wall 5 and a side wall 6 provided with a bolting flange 7 which may be bolted to main casing flange 2 by bolts 8. In the present instance, side wall 6 is shown as being formed from two parts bolted together as shown at 9 but it may be formed as a single part. In end wall 5 are a number of spaced openings each surrounded by a raised pad having a finished surface against which an auxiliary device may be bolted.

Attached to end wall 5 within the confines of side wall 6 are two spiders 10 and 11. Spider 10 is spaced from wall 5 by socketed posts 12 on wall 5 and spider 11 is spaced from spider 10 by hollow posts 13 on spider 10, spider 11 being provided with openings 14 in alignment with the sockets in posts 12 and the opening through posts 13. In certain of the openings are dowel pins 15 which serve to align the spiders and end wall. Through other of the openings are bolts 16 which pass through openings 14 in spider 11, openings in posts 13 and thread into sockets in posts 12. The two posts 12$^a$ align with opening 13$^a$ in spider 10 and receive bolts for fastening spider 10 to wall 5. Thus the two spiders 10 and 11 are rigidly mounted on end wall 5 in spaced relation to it and to each other. They carry the gearing for driving all the auxiliaries. In the present instance, there are auxiliaries as follows: starting motor 20, starter fuel pump 21, electric generator 22, tachometer generator 23, lubrication and scavenging pump 24, speed governor 25 and main fuel pump 26. Each is suitably bolted to the outside of end wall 5 over an opening in the wall and with its drive shaft projecting through the opening. The bolting arrangements for starting fuel pump 21 and lubrication and scavenging pump 24 are shown in Fig. 1. The bolting arrangements for the other auxiliaries may be similar.

At the central portion of spider 11 is a suitable boss 27 having a round bore in which are positioned bearings 28 in which is mounted a drive shaft 29. On the one end of shaft 29 is an internally splined head 30 into which fits the spline 4 on the end of shaft 3. On the other end of shaft 29 is a main driving pinion 31. Meshing with pinion 31 on opposite sides are two driving gears 32 and 33.

Driving gear 32 is carried by a shaft 34 in two bearings, one in end wall 5 and the other in spider 11. In Fig. 2 the bearing for the left hand end of shaft 34 is indicated at 35. It is positioned in bearing holder 36 in end wall 5. The bearing for the right hand end of shaft 34 is positioned in a bearing holder 37 in spider 11. The right hand end of shaft 34 is threaded to receive a nut for holding the shaft assembled in its bearings. On shaft 34 is a pinion 38 which meshes with a gear 39 mounted on a shaft 40. One end of shaft 40 is mounted in a bearing carried in a bearing holder 41 in spider 11. The other end of shaft 40 is carried in a bearing 42 mounted in a bearing holder 43 in end wall 5. Shaft 40 has a splined socket in its end with which engages a splined head 44 on the end of the shaft of generator 22. Thus the generator is driven through a double reduction gearing journaled in spider 11 and end wall 5.

Gear 33 is fixed on a shaft 45 which at one end is mounted in a bearing carried in a bearing holder 46 in spider 11, the end of the shaft being threaded to receive a nut for holding the shaft assembled in its bearings. The other end of shaft 45 is mounted in a bearing 47 carried in a bearing holder 48 in end wall 5. Also fixed on shaft 45 is a pinion 49 which meshes with two gear wheels 50 and 51. Meshing with gear wheel 51 is a gear wheel 52 and with gear wheel 52 a gear wheel 53. Gear wheels 50, 51, 52 and 53 are fixed on hollow shafts which are suitably mounted in bearings carried by spider 10 and end wall 5. In Fig. 1, the shaft 54 for gear wheel 52 which drives the lubricating pump 24 and its bearings 55 and 56 are shown in section. The hollow shaft is splined on its interior at one end to receive the splined head 57 on the end of the lubricating pump shaft. Shaft 54 is held in position in its bearings by a flange at its left hand end and a nut 58 on its right hand end. The shaft and bearing arrangements for gear wheels 50, 51 and 53 are similar to that for gear wheel 52. The shaft of gear wheel 50 is connected to the coupling head 59 on the end of the shaft of fuel pump 26. In Fig. 2, fuel pump 26 is shown as being unbolted from end wall 5 and spaced therefrom for purposes of illustration. It is bolted over the opening 60 with its spline 59 projecting through the opening. The shaft of gear wheel 51 is connected to the spline 61 on the end of the shaft of governor 25, and the shaft of gear wheel 53 is connected to the spline 62 on the end of the shaft of the tachometer generator 23.

On the left hand end of shaft 29 is one member 65 of an over-running clutch, the other member 66 of which is carried by a gear wheel 67 fixed on a shaft which is carried in bearings supported in a bearing housing 68, the bearing housing in turn being mounted in a hollow boss 69 formed integral with end wall 5. Meshing with gear wheel 67 is a pinion 70 on the end of the shaft of starting motor 20 and a pinion 71 on the end of the shaft of starting fuel pump 21.

Bolted on the outside of end wall 5 is a cone-shaped bracket 72 on the end of which is mounted a supporting member 73. At 74 is indicated a lubricating pipe which supplies lubricant through a pipe 75 to certain parts to lubricate them.

The starting motor 20 is used to start the power plant, driving shaft 3 and connected parts through the over-running clutch and the starting fuel pump through pinion 71. After the power plant is started, shaft 3 drives the various parts, the starting motor and starting fuel pump being disconnected by reason of the over-running clutch.

From the foregoing, it will be seen that all the auxiliaries of the power plant and the gearing for driving them are carried by the auxiliaries casing comprising end wall 5 and side wall 6, that the auxiliaries casing is fastened to the casing of the power plant by the ring of bolts 8, and that the power connection to the power plant is by means of a single detachable drive connection 3. With this arrangement, all the auxiliaries and their gearing may be assembled on the auxiliaries casing and tested as a unit before they are mounted on and connected to the power plant, a thing of substantial advantage from a manufacturing standpoint. At any time any auxiliary may be quickly removed and a new one substituted without disturbing the other auxiliaries or the gearing. Or, at any time, an auxiliaries section may be replaced by an entirely new one which has been previously tested and adjusted by merely removing the ring of bolts 8, removing the old section and bolting in place the new section.

What I claim as new and desire to secure by Letters Patent of the United States is:

1. In a power plant, an auxiliaries casing comprising an end wall, auxiliaries detachably connected to said end wall on its outer side with their shafts projecting through the end wall to the inside thereof, spiders fixed to said end wall on its inner side in spaced relation to said end wall and to each other, gearings for driving the auxiliaries having shafts journaled in said end wall and spiders, said gearing including a driving shaft, and means for detachably connecting said end wall to a power plant casing wall and said driving shaft to a power plant shaft whereby said auxiliaries casing with the auxiliaries and gearing assembled thereon may be attached to and removed from a power plant casing as a unit.

2. In a power plant, an auxiliaries casing comprising an end wall, auxiliaries detachably connected to said end wall on its outer side with their shafts projecting through the end wall to the inside thereof, spiders fixed to said end wall on its inner side in spaced relation to said end wall and to each other, a main drive shaft, gearing having shafts journaled in said end wall and spiders through which said main drive shaft is connected to certain of said auxiliaries, gearing including an overrunning clutch having shafts journaled in said end wall and spiders through which said main drive shaft is connected to other of said auxiliaries, and means for detachably connecting said end wall to a power plant casing wall and said main drive shaft to a power plant shaft.

3. In a power plant including a prime mover having a housing and a drive shaft with a portion forming a coupling means projecting from said housing, a self-contained auxiliaries support and driving casing with an auxiliaries drive shaft having an end portion adapted to engage said coupling means, a plurality of auxiliary devices detachably secured to the outside of said casing with their shafts projecting through the casing wall to the inside thereof, said auxiliaries including a first group of devices driven only during the starting cycle of the powerplant and a second group of devices driven at all times when the auxiliaries drive shaft rotates, means for detachably connecting the auxiliaries casing to said housing with said shaft portions in driving engagement, spider means attached to the auxiliaries casing on the inside thereof and in spaced relation therewith, gearing having shafts journaled in said spider means and auxiliaries casing wall through which the auxiliaries drive shaft is always drivingly connected to said second group of auxiliaries, and gearing including an overrunning clutch through which said first group of auxiliaries is drivingly connected to the drive shaft during the starting cycle only.

4. In combination with a powerplant including a prime mover having a housing and a shaft with a portion projecting from said housing, a self-contained auxiliaries support and driving casing with an auxiliaries drive shaft having an end portion adapted to drivingly engage said powerplant shaft, a plurality of auxiliary devices detachably secured to the outside of said casing with their shafts projecting through the casing wall to the inside thereof, said auxiliaries including a starting motor adapted to produce torque only during the starting cycle of the powerplant and a group of other auxiliaries adapted to rotate at all times when the auxiliaries drive shaft rotates, means for detachably connecting the auxiliaries casing to the powerplant housing with the powerplant shaft in driving engagement with the auxiliaries drive shaft, spider means attached to the auxiliaries casing on the inside thereof and in spaced relation therewith, gearing including a shaft journaled in the auxiliaries casing and overrunning clutch means through which the starting motor is drivingly connected to the auxiliaries drive shaft only when said motor is producing torque, and gearing having shafts journaled in said spider means and auxiliaries casing through which said other auxiliaries are at all times drivingly connected to the auxiliaries drive shaft.

DONALD F. WARNER.

REFERENCES CITED

The following references are of record in the file of this patent:

UNITED STATES PATENTS

| Number | Name | Date |
|---|---|---|
| 1,860,703 | Christian | May 31, 1932 |
| 2,036,389 | Bannan | Apr. 7, 1936 |
| 2,069,843 | Niven | Feb. 9, 1937 |
| 2,164,670 | Thomas | July 4, 1939 |
| 2,335,186 | Jackson | Nov. 23, 1943 |
| 2,330,296 | Lundberg | Sept. 28, 1943 |

FOREIGN PATENTS

| Number | Country | Date |
|---|---|---|
| 101,493 | Switzerland | Oct. 16, 1923 |
| 473,229 | Great Britain | Oct. 8, 1937 |